Nov. 18, 1952  E. W. ROTOLO  2,618,077
COLORING APPLIANCE FOR PREFORMED PICTURES IN REVERSE
Filed Dec. 16, 1948  2 SHEETS—SHEET 1
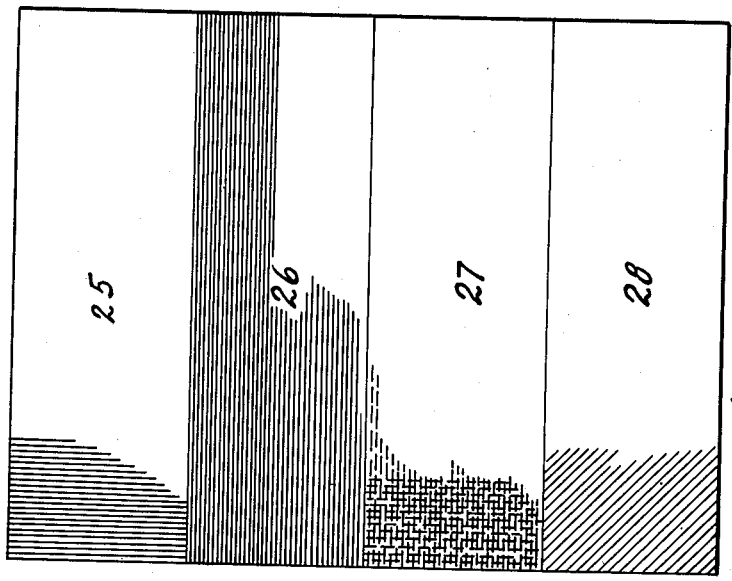
FIG. 3
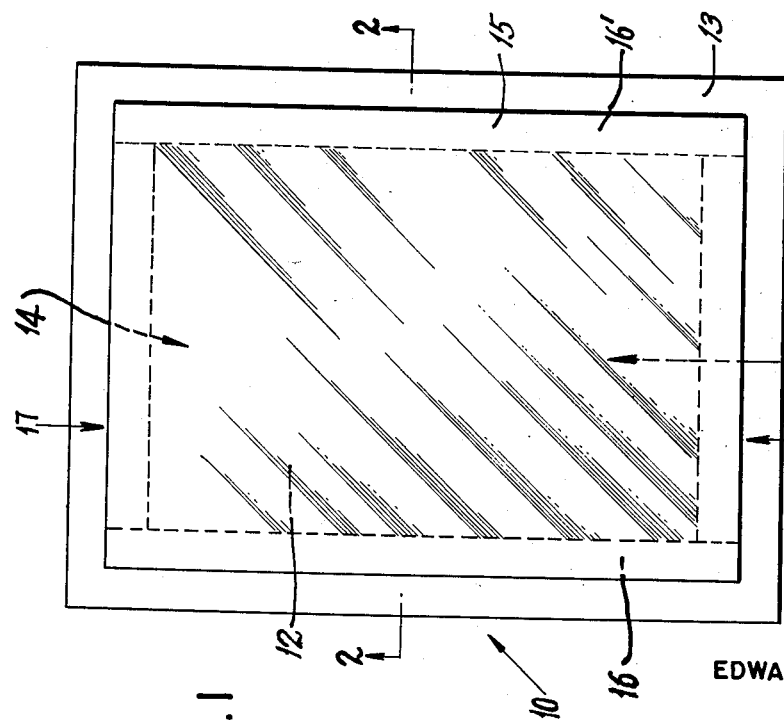
FIG.1
FIG.2
EDWARD W. ROTOLO
INVENTOR.
BY *Joseph Blaeker*
ATTORNEY Nov. 18, 1952     E. W. ROTOLO     2,618,077
COLORING APPLIANCE FOR PREFORMED PICTURES IN REVERSE
Filed Dec. 16, 1948     2 SHEETS—SHEET 2
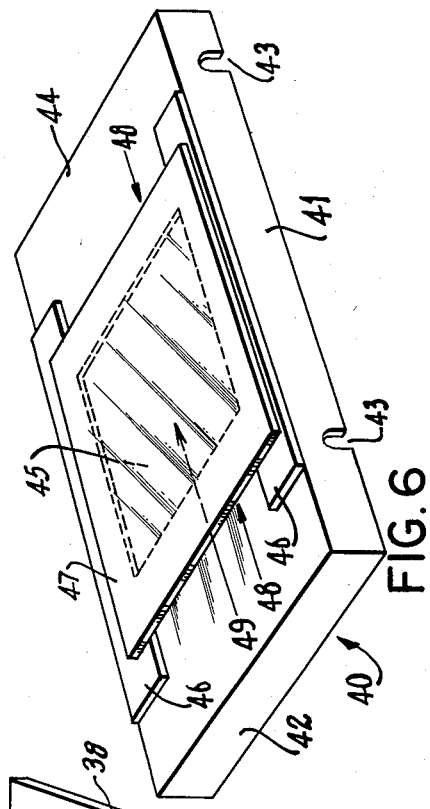
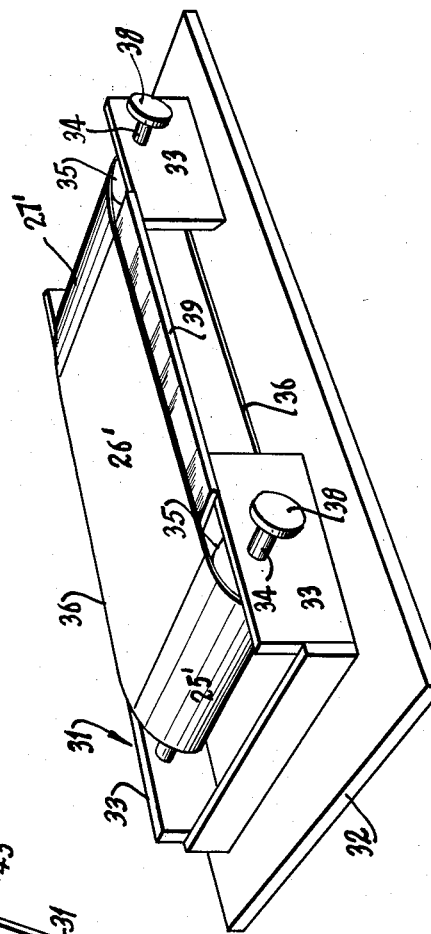
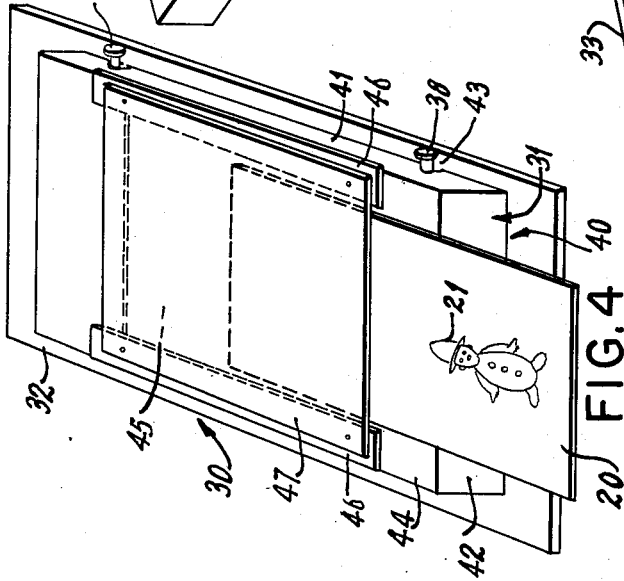
EDWARD W. ROTOLO
*INVENTOR.*
BY Joseph Blacker
ATTORNEY Patented Nov. 18, 1952

2,618,077

UNITED STATES PATENT OFFICE 2,618,077

COLORING APPLIANCE FOR PREFORMED PICTURES IN REVERSE

Edward W. Rotolo, Brooklyn, N. Y.

Application December 16, 1948, Serial No. 65,710

1 Claim. (Cl. 35—26)

This invention relates to an educational drawing pad or drawing appliance primarily intended for educational and amusement purposes and designed to afford creative pastime entertainment and development of graphic talent for children and others.

An object of this invention is to provide a device which enables a child to produce a colored picture or drawing in reverse on the back of a sheet which contains guide matter or outlines of figures on the normally exposed surface thereof.

Another object of this invention is to provide a composite coloring appliance for coloring the back of a paper having skeleton pictures preformed on the exposed surface of the paper and comprising a base layer having superposed layer of colored carbon paper, a hollow layer covering the marginal portions of the colored carbon paper, and a layer of transparent material attached to the hollow layer, the central portion of the hollow layer having an opening forming a transparent window through which the central portion of the colored carbon paper is exposed, the space between two aligned sides of the transparent material providing a passageway below the transparent material and permitting insertion and removal of a paper having the preformed skeleton picture for sectionally coloring the skeleton picture on the reverse side of the said paper.

With the above and other objects in view, the invention will be hereinafter more particularly described, and the combination and arrangement of parts will be shown in the accompanying drawings and pointed out in the claim which forms part of this specification.

Reference will now be had to the drawings, wherein like numerals of reference designate corresponding parts throughout the several views, in which:

Figure 1 is a plan view of a coloring pad embodying the invention.

Figure 2 is a cross-sectional view taken on line 2—2 in Figure 1.

Figure 3 is a plan view of a variously colored layer which may form the base portion of the coloring pad.

Figure 4 is a perspective view of a drawing appliance providing an equivalent of the coloring pad shown in Figures 1 to 3 inclusive.

Figure 5 is a perspective view of a hollow casing wherein an endless belt coloring carrier is rotatably mounted.

Figure 6 is a perspective view of a cover for the casing shown in Figure 5.

In the illustrated embodiment of the invention, the numeral 10 indicates a composite coloring pad or coloring appliance comprising a rigid rectangular base layer 11 and a sheet of colored carbon paper 12 superposed over and suitably secured to the base layer.

A frame-shaped layer 13 is superposed over the colored carbon paper 12 and covers the marginal portions of the paper 12. The central portion of the frame-shaped layer 13 provides a window 14 through which the central portion of the colored carbon paper 12 is exposed.

A layer of transparent plastic material 15 is secured along parallel marginal portions of two lengthwise sides 16, 16', defining the window 14, so as to leave endwise openings 17 between the transparent layer 15 and the frame-shaped layer 13. The endwise openings 17 provide a passageway 18 through which a rectangular sheet of paper 20 having a pre-formed picture 21 (Figure 4) may be moved so as to bring the picture 21 in registry with the window 14 and with its lower surface in contacting relation with the colored carbon paper 12.

The user may, by rubbing a pencil-like implement having a smooth and rounded end portion against the transparent plastic material 15, exert line pressure against the colored carbon paper 12 and thereby cause the figure or picture 21 to be colored with the particular color of the colored carbon paper 12.

It is to be noted that the coloring takes place in reverse on the back of the sheet which contains guide matter or outlines of figures on the normally exposed surface thereof.

By removing the paper 20 from the composite coloring pad 10 and inserting it in another composite coloring pad having a different color carbon paper, it is possible to variously color sections of the figure 21.

I may, however, use a modified colored carbon paper 24 having crosswise sections colored red 25, blue 26, yellow 27, and green 28, etc., as part of the composite pad 10. The user may then shift the figured paper 20 over the differently colored portions of the variously colored carbon paper 24 and thus apply various colors in reverse on the back of the figured paper 20.

It is to be noted that the transparent plastic material 15 forms a protective covering for the exposed portion of the colored carbon paper. Also that the frame-shaped layer 13 fully covers the marginal edge portions of the colored carbon paper and prevents the discoloring or smudging of the fingers of the user.

It is also to be noted that by the term colored carbon paper I mean to include any transfer medium such as ink, carbon, crayon, etc.

Figures 4 to 6 inclusive, show a modified coloring appliance 30 comprising a hollow casing 31 secured to a base 32 and having upright wall sections 33 in which shafts 34 are rotatably mounted. Rollers 35 are secured to the shafts 34 and carry an endless belt 36 having variously colored transfer sections 25', 26', and 27', etc. Handles 38 are secured to the shafts 34. By actuating one of the handles 38, the user can bring any colored portion of the belt 36 to face upwardly and in supported contacting relation over a platform 39.

A hollow cover 40 of a size to fit over the wall sections 33 is made to cover and conceal all the mechanism in the casing 31, down to the base 33. The cover 40 has side walls 41 and 42 suitably fastened together. The walls 41 have cut-out portions 43 designed to receive the shafts 34 when the lower faces of the walls 41 contact the base 32.

The cover 40 has a horizontal frame-shaped top wall 44 having a central opening or window 45. Suitably secured to the marginal portions of the two lengthwise sides of the top wall 44 are two spacing strips 46 over which is secured a transparent plastic sheet of material 47.

It is to be noted that the cover 40 provides two endwise openings 48, 48, between the transparent layer 47 and the frame-shaped top wall 44. The endwise openings 48 provide a passageway 49 through which the rectangular sheet of paper 20 having the preformed picture 21 may be moved so as to bring the picture 21 in registry with the window 45 and with its lower surface in contacting relation with the colored carbon paper on the endless belt 36 and supported by the platform 39.

Similar to the operation of the composite coloring pad 10, the user may, by rubbing a pencil-like implement or stylus against the transparent plastic material 47, exert pressure against the colored carbon paper or the endless belt 36 and thereby cause the figure or picture 21 to be colored with the particular transfer color in registry with the window 45, the coloring taking place in reverse on the back of the paper 20. The result is the same as that produced with the coloring pad or appliance 10.

It is to be noted that the picture transfer is due to the pressure exerted on the colored carbon paper. It is obvious that this transfer is possible only when the transparent plastic material 47 is flexible.

In accordance with the patent statutes I have described and illustrated the preferred embodiment of my invention, but it will be understood that various changes and modifications can be made therein without departing from the spirit of the invention as defined by the appended claim.

I claim:

A composite coloring appliance for coloring the back of a paper with skeleton pictures pre-formed on the exposed face of said paper, comprising a rigid base layer, a superposed coloring layer, a hollow layer covering the marginal portions of said coloring layer, and a layer of transparent flexible material attached along two lengthwise aligned sides and unattached at its transverse sides to said frame-shaped layer, the central portion of said frame-shaped layer having an opening forming a transparent flexible window through which the central portion of said coloring layer is exposed, the space between said two lengthwise attached and aligned sides of said transparent material providing a passageway opening below said transparent material at each end of said coloring appliance, permitting insertion and removal of a paper having the preformed skeleton picture for sectionally coloring said skeleton picture, said coloring layer having successive sections differently colored, and means for rotatably supporting said coloring layer to selectively bring any one of said colored sections in registry with said transparent window to variously color said skeleton picture.

EDWARD W. ROTOLO.

REFERENCES CITED

The following references are of record in the file of this patent:

UNITED STATES PATENTS

| Number | Name | Date |
|---|---|---|
| 1,289,342 | Witte | Dec. 31, 1918 |
| 1,559,665 | Beery et al. | Nov. 3, 1925 |
| 2,044,760 | Anderson | June 23, 1936 |
| 2,103,943 | Gorton | Dec. 28, 1937 |
| 2,217,270 | Gibbs | Oct. 8, 1940 |
| 2,427,612 | Lobb | Sept. 16, 1947 |